United States Patent
Hajmrle et al.

(10) Patent No.: US 7,052,527 B2
(45) Date of Patent: May 30, 2006

(54) THERMAL SPRAY COMPOSITION AND METHOD OF DEPOSITION FOR ABRADABLE SEALS

(75) Inventors: Karel Hajmrle, Edmonton (CA); Petr Fiala, Edmonton (CA)

(73) Assignee: Sulzer Metco (Canada) Inc., Fort Sasketchewan (CA)

( * ) Notice: Subject to any disclaimer, the term of this patent is extended or adjusted under 35 U.S.C. 154(b) by 38 days.

(21) Appl. No.: 10/834,215

(22) Filed: Apr. 29, 2004

(65) Prior Publication Data

US 2005/0287390 A1    Dec. 29, 2005

Related U.S. Application Data

(62) Division of application No. 10/346,124, filed on Jan. 17, 2003, now Pat. No. 6,808,756.

(51) Int. Cl.
*B22F 1/00* (2006.01)
*B22F 7/00* (2006.01)

(52) U.S. Cl. ............... 75/252; 106/286.1; 428/402; 428/457; 428/564; 428/688

(58) Field of Classification Search ............ 75/252; 106/286.1; 428/402, 457, 564, 688
See application file for complete search history.

(56) References Cited

U.S. PATENT DOCUMENTS

| | | | | |
|---|---|---|---|---|
| 3,914,507 A | * | 10/1975 | Fustukian | 428/404 |
| 5,315,970 A | * | 5/1994 | Rao et al. | 123/193.2 |
| 5,364,663 A | * | 11/1994 | McCune et al. | 427/449 |
| 5,536,022 A | * | 7/1996 | Sileo et al. | 277/415 |
| 5,702,769 A | * | 12/1997 | Peters | 427/451 |
| 5,976,695 A | * | 11/1999 | Hajmrle et al. | 428/402 |
| 2003/0180565 A1 | * | 9/2003 | Herbst-Dederichs | 428/553 |
| 2003/0228483 A1 | * | 12/2003 | Fiala et al. | 428/564 |

* cited by examiner

*Primary Examiner*—Ngoclan T. Mai
(74) *Attorney, Agent, or Firm*—Arne I. Fors

(57) ABSTRACT

A thermal spray composition and method of deposition for abradable seals for use in gas turbine engines, turbochargers and steam turbines. The thermal spray composition comprises a mixture of metal-clad solid lubricant particles and unclad solid lubricants particles for producing an abradable seal used in the compressor section of gas engines, aircraft engines, radial compressors and the like. The metal is selected from alloys of Ni, Co, Cu, Fe and Al, preferably Ni alloys, and the solid lubricant is at least one of hexagonal boron nitride, graphite, calcium fluoride, lithium fluoride and molybdenum disulphide, preferably hexagonal boron nitride or hexagonal boron nitride and graphite.

11 Claims, No Drawings

THERMAL SPRAY COMPOSITION AND METHOD OF DEPOSITION FOR ABRADABLE SEALS

This application is a Divisional of application Ser. No. 10/346,124 filed Jan. 17, 2003 now U.S. Pat. No. 6,808,756.

BACKGROUND OF THE INVENTION (i) Field of the Invention

This invention relates to abradable seals and, more particularly, relates to high-temperature abradable seal compositions for use in gas turbine engines, turbochargers, compressors, steam turbines and the like.

(ii) Description of the Related Art

Basic requirements for abradable seals in the compressor section of gas turbine engines include good abradability, spall resistance, and erosion resistance. Abradable seals are also required to exhibit low gas permeability, a smooth surface, good aging properties and long-term oxidation resistance at high temperatures. In the case of abradability, the seal is a sacrificial element, it being desirable to minimize blade wear. Additionally, low gas permeability is required in order to minimize gas flow through the seal itself. It has been shown that low permeable seals with a smooth surface finish improve overall compressor efficiency by about one percent as compared to conventional permeable seals. In addition, low permeability of the seal prevents entrapment of fine particles, e.g. dust or grit, which can act as an abrasive against the blade tips, thus wearing them unevenly. Smooth surface finishes in the gas path improve overall airflow, also contributing to efficiency. Finally, long-term oxidation resistance is required due to increases in compressor operating temperature up to 815° C.

There are several air seals used in a compressor section of a gas or aircraft engine. Historically the oldest is feltmetal that comprises a plurality of metal fibres. The feltmetal is described for example in U.S. Pat. No. 4,257,735. The most important disadvantages of this seal are that it has to be brazed to the substrate material and that it is highly porous.

Typical jet engine compressor air seals include a metal matrix of aluminum-silicon with embedded polymer particles or hexagonal boron nitride powder particles as described in U.S. Pat. No. 3,723,165 and U.S. Pat. No. 5,506,055, respectively. The disadvantage of these systems is their limited temperature capability at 315° C. for the system with polymer and 480° C. for the system with hexagonal boron nitride. In the former case, the temperature capability is governed by the polymer and in the latter case it is governed by the aluminum silicon alloy.

Abradable materials used at high temperatures in the compressor section of turbine engines are usually NiCrAl/Bentonite coatings described in U.S. Pat. Nos. 4,374,173 and 4,291,089 by Adamovic. However, NiCrAl/Bentonite seals do not rub well against Ti alloy blades. These coatings perform well against Ni alloy and steel blades but, when Ti alloy blades are used, the blade tips overheat and are subject to wear. Sometimes, glazing of the coating is observed.

Another known abradable seal is that prepared by the techniques of Rangaswamy et al., described in U.S. Pat. No. 5,434,210. A composite powder for thermal spraying of abradable coatings is disclosed in which the composite powder contains three components. One component is any of a number of metal or ceramic matrix materials, another component is a solid lubricant, and the third component is a polymer. Typical as-sprayed coatings comprise a Co alloy matrix with dispersed particles of hexagonal boron nitride and polymer. The polymer is subsequently burned out and the final very porous structure contains only hexagonal boron nitride particles dispersed throughout the Co-based matrix. The coatings prepared from this material have acceptable abradability but low erosion resistance. The erosion resistance is required in order to maintain uniform clearances throughout the life of the engine or engine performance characteristics are adversely affected. Conventional commercial turbine engines have exhibited a two percent increase in airflow around blade tips as a result of seal erosion after approximately 3,000 flights. Much of this may be attributed to erosion of the abradable seal and blade airfoil tip, and to rub interactions between the blade tips and the seal. In military engine applications, where gas path velocities are relatively high, erosion resistance is of paramount importance.

Moreover, high permeability due to open porosity of conventional seals enables back leakage of gas, which decreases engine efficiency.

We have found that the use of Ni alloy-clad hexagonal boron nitride powder applied by flame or plasma spraying provided an abradable seal which exhibited poor combination of erosion resistance and abradability. When erosion resistance was acceptable, the abradability was poor. When abradability was satisfactory, the erosion resistance was poor. Ni alloy-clad boron nitride, accordingly, is not suitable for use as an abradable seal.

It is accordingly a principal object of the present invention to provide a novel thermal spray composition and its method of application for producing an abradable seal.

A further object of the invention is the provision of an abradable seal, for use in gas turbine engines having good abradability, spall resistance and erosion resistance, particularly when used in conjunction with titanium-alloy blades.

It is another object of the present invention to provide an abradable seal having a smooth surface, low permeability, good thermal conductivity, low interparticle cohesive strength and long-term oxidation and glazing resistance resulting in favourable long-term aging characteristics.

SUMMARY OF THE INVENTION

In its broad aspect, the thermal spray powder composition of the invention for an abradable seal comprises a mixture of metal clad lubricant powder and unclad lubricant powder, said mixture having about 5 to 30 wt %, preferably about 10 to 20 wt %, unclad lubricant powder, and about 70 to 95 wt %, preferably about 80 to 90 wt %, of a metal-clad solid lubricant powder having a size in the range of 10 to 150 microns. The composition can be in the form of a powder or a powder consolidated as a wire or rod. The solid lubricant is at least one of hexagonal boron nitride, graphite, calcium fluoride, lithium fluoride and molybdenum disulphide particles, preferably hexagonal boron nitride powder or a mixture of hexagonal boron nitride and graphite. The matrix-forming metal, a metal alloy cladding, is selected from Ni, Co, Cu, Fe, Al, and combinations and alloys thereof, particularly nickel alloys such as NiCrAl and NiCr, and CuAl and AlSi.

The matrix-forming metal alloy and the solid lubricant can also contain some other elements as impurities, that significantly do not alter the seal properties.

The composition can also contain a fugitive phase to create porosity after the elimination from the abradable coating, the fugitive phase consisting at least one of salt, sugar and other fugitive materials.

In accordance with another broad aspect of the invention, the composition comprises about 70 to 95 wt % of a metal alloy-clad solid lubricant and about 5 to 30 wt % of unclad solid lubricant.

The method of providing an abradable seal on a substrate comprises applying an adherent coating of the said powder composition having a thickness of up to 3 mm to the substrate by thermally spraying the powder composition thereon such as by plasma spraying, combustion spraying or wire spraying.

DESCRIPTION OF THE PREFERRED EMBODIMENTS

The abradable seal of the present invention comprises a matrix-forming metal or metal alloy component and a solid lubricant component, wherein the two components provide a synergism in abradable coatings which have unexpected superior characteristics over prior art materials. The matrix-forming metal alloy present as a metal cladding on a solid lubricant powder is selected from the metals Ni, Co, Cu, Fe, Al and combinations and alloys thereof, preferably NiCrAl, NiCr, CuAl and AlSi. The solid lubricant is typified by lubricants such as hexagonal boron nitride, graphite, calcium fluoride, lithium fluoride and molybdenum disulphide particles, preferably hexagonal boron nitride or hexagonal boron nitride and graphite particles. A preferred composition of metal alloy clad on a solid lubricant is hexagonal boron nitride or hexagonal boron nitride and graphite particles clad with NiCrAl alloy. The metal-clad solid lubricant particles are blended with unclad particles of solid lubricant particles such as hexagonal boron nitride or hexagonal boron nitride and graphite available from commercial suppliers.

The unclad solid lubricant component comprises at least 5 wt % and not more than 30 wt % of the composition, preferably 10 to 20 wt % of the composition, the balance comprising the metal clad solid lubricant component. The metal-clad solid lubricant component comprises at least 60 wt % and not more than 95 wt % of a metal phase and at least 5 wt % and not more than 40 wt % of a solid lubricant phase.

Although the description proceeds herein with reference to a blend of metal-clad solid lubricant particles and unclad solid lubricant particles, it will be understood that the powder composition may also be prepared in the form of agglomerated particles or in the form of wire or rod.

The two-phase powder composition of the invention preferably is applied to a substrate by thermal spray to form an abradable seal. Thermal spraying involves the softening or melting of a heat fusible metal component material by heat and propelling the softened or melted material in particulate form against a surface to be coated. The heated particles strike the surface where they are cooled and bonded thereto. The solid lubricant particles impact the coating surface and adhere to it mainly by mechanical interlocking. Usually the percentage of solid lubricant in the coating is less than in the powder because the metal-clad particle sticks better to the target than the solid lubricant particle. A conventional thermal spray gun may be used for the purpose of the both heating and propelling the particles.

A thermal spray gun normally utilizes a combustion or plasma or electric arc to produce the heat for melting of the powder particles. In a powder type combustion thermal spray gun, the carrier gas, which entrains and transports the powder, is typically an inert gas such as argon. In a plasma spray gun, the primary plasma gas is generally argon or nitrogen. Hydrogen or helium is usually added to the primary plasma gas, and the carrier gas is generally the same as the primary plasma gas. Other thermal spray methods could also be used. A good general description of thermal spraying is provided in U.S. Pat. No. 5,049,450.

The matrix-forming metal-clad solid lubricant powder such as NiCrAl-clad hexagonal boron nitride can be dry blended and mixed with the unclad powder such as hexagonal boron nitride. The matrix metal alloy holds the particles of the solid lubricant in place and adherently bonds the coating to the substrate.

The solid lubricant particles are uniformly dispersed throughout the deposited coating. Thus any material removal that occurs does not change coating properties of the remaining seal. Coatings of the invention prepared by thermal spraying the coating composition onto a substrate have an excellent combination of abradability and erosion resistance as a result of the coating properties including low coating cohesive strength, low porosity, low surface roughness and high thermal conductivity. As a result, the coatings can be effectively used in combination with titanium-alloy blades without danger of titanium fire, coating glazing or excessive blade wear. Overall engine efficiency is increased.

The powder composition is typically prepared as a blend. The metallic content of the metal-clad solid lubricant component provides coating matrix that holds the solid lubricant particles in place, bonds the coating to the substrate and provides oxidation resistance. An addition of the unclad solid lubricant powder component causes a decrease in the hardness and strength of the metallic matrix material owing to separation of metallic particles by solid lubricant particles and enhances the ejection of the particles from the coating when abraded. Due to its softness it decreases blade wear and improves abradability. The clad solid lubricant also contributes to the decrease in the matrix strength and hence improves abradability. During the rubbing process by engine blades, the material abrades readily due to low matrix strength caused by the effect of the solid lubricant particles. The metal alloy matrix would collapse and compress during a rubbing process without the solid lubricant filler and the coating would become very hard with subsequent significantly decreased abradability. Coating glazing is limited by easy particle ejection when rubbed by a compressor blade. Coatings prepared by thermal spraying this powder have excellent abradability and negligible blade wear under a variety of rubbing conditions. These properties directly follow from low coating cohesive strength, low porosity, low surface roughness and high thermal conductivity. As a result the coatings could be used against Ti alloy blades without danger of Ti fire, coating glazing and excessive blade wear throughout the full range of temperatures at which titanium blades are used (up to 600° C.) and above where nickel and steel based blades are used.

The present invention provides a number of important advantages. The addition of unclad solid lubricant increases abradability and decreases blade wear, without sacrificing erosion resistance. Glazing due to severe blade rubbing is minimized, which can be attributed to the low coating interparticle strength and good thermal conductivity. It has been found that the enhanced thermal conductivity due to the dense structure promotes dissipation of heat generated during severe rub conditions, thereby decreasing the chance of titanium fire.

It will be understood, of course, that modifications can be made in the embodiments of the invention illustrated and described herein without departing from the scope and purview of the invention as defined by the appended claims.

The invention claimed is:

1. A thermal spray powder composition for an abradable seal comprising about 70 to 95 wt % of a metal-clad solid lubricant and about 5 to 30 wt % solid lubricant.

2. A thermal spray powder composition for an abradable seal comprising about 80 to 90 wt % of a metal-clad solid lubricant and about 10 to 20 wt % of unclad solid lubricant.

3. A thermal spray composition as claimed in claim 1, in which the solid lubricant is at least one lubricant powder selected from the group consisting of hexagonal boron nitride, graphite, calcium fluoride, lithium fluoride, magnesium fluoride, barium fluoride, tungsten disulfide and molybdenum disulfide particles.

4. A thermal spray composition as claimed in claim 1, in which the solid lubricant is a mixture of hexagonal boron nitride and graphite particles.

5. A thermal spray composition as claimed in claim 1, in which the solid lubricant is hexagonal boron nitride particles.

6. A thermal spray composition as claimed in claim 3, in which the thermal spray composition is a powder, a wire or a rod and in which the metal alloy cladding is selected from the group consisting of Ni, Co, Cu, Fe, Al, and combinations and alloys thereof.

7. A thermal spray composition as claimed in claim 4, in which the metal alloy cladding is selected from the group consisting of Ni, Co, Fe and combinations and alloys thereof.

8. A thermal spray composition as claimed in claim 5, in which the metal alloy cladding is Ni, NiCr, NiCrAl or Ni alloy.

9. A thermal spray composition as claimed in claim 5, in which the metal alloy cladding is NiCrAl.

10. A thermal spray composition as claimed in claim 5, in which the metal alloy cladding is selected from the group consisting of Ni, Co, Fe and combinations and alloys thereof.

11. An abradable seal for gas turbine engines, turbo changers, compressors or steam turbines produced by applying an adherent coating having a thickness up to 3 mm to a substrate by thermally spraying a composition thereon comprising about 70 to 95 wt % of a metal-clad solid lubricant comprised of hexagonal boron nitride clad with a metal selected from the group consisting of Ni, NiCr, NiCrAl and Ni alloy, and about 5 to 30 wt % of a solid lubricant comprised of hexagonal boron nitride.

* * * * *